(12) United States Patent
Yanagawa et al.

(10) Patent No.: US 6,346,695 B2
(45) Date of Patent: *Feb. 12, 2002

(54) OPTICAL PICKUP DEVICE

(75) Inventors: Naoharu Yanagawa; Takahiro Togashi; Shinichi Nagahara, all of Tokorozawa (JP)

(73) Assignee: Pioneer Electronic Corporation, Tokyo-to (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/273,724

(22) Filed: Mar. 22, 1999

(30) Foreign Application Priority Data

Mar. 24, 1998 (JP) .......................................... 10-095414

(51) Int. Cl.[7] .............................. G01J 1/32; G11B 7/00
(52) U.S. Cl. ...................................... 250/205; 369/116
(58) Field of Search ........................... 250/205, 201.5, 250/216; 369/116

(56) References Cited

U.S. PATENT DOCUMENTS

| | | | | |
|---|---|---|---|---|
| 4,870,632 A | * | 9/1989 | Shiono et al. | 369/44 |
| 5,293,372 A | * | 3/1994 | Hoshino et al. | 369/116 |
| 5,600,621 A | * | 2/1997 | Noda et al. | 369/116 |

FOREIGN PATENT DOCUMENTS

JP          9-91704         * 4/1997

* cited by examiner

Primary Examiner—Jordan M. Schwartz
(74) Attorney, Agent, or Firm—Nixon & Vanderhye P.C.

(57) ABSTRACT

A light beam is emitted by a light source, and an optical system separates the light beam into a main-portion and a sub-portion. The main-portion of the light beam is guided to an information storage medium. A monitor detector receives the sub-portion of the light beam and outputs a detection signal. A controller controls the output power of the light beam emitted by the light source based on the detection signal. Thus, the light beam of the sub-portion, which is not generally used as a light beam to be irradiated on a storage medium, can be efficiently used, and hence the output power of the light beam from the light source may be accurately controlled.

11 Claims, 14 Drawing Sheets

OPTICAL PICKUP DEVICE

BACKGROUND OF THE INVENTION

1. Field of the Invention

The present invention relates to an optical pickup device for converging a light beam from a semiconductor laser onto an optical disc serving as a storage medium. More specifically, this invention relates to an optical pickup device which detects a quantity of a light beam emitted from a semiconductor laser, by means of a front monitor, to perform a power control of the light beam.

2. Description of the Prior Art

In general, an optical pickup for recording information signal onto a storage medium such as an optical disc is equipped with a semiconductor laser having a light emission power of 30 mW order. As a method of controlling the power of the light beam emitted from the semiconductor laser, there are known two methods: a front monitor method and a rear monitor method. In the front monitor method, a part of the light beam emitted from the semiconductor laser toward the storage medium is detected by a light detector, and the detected signal is fed back to a drive circuit of the semiconductor laser so as to control the power of the light beam emitted from the semiconductor laser to be a predetermined level. On the other hand, in the rear monitor method, the light beam emitted from the backface of the semiconductor laser, i.e., the light emission surface opposite to the light emission surface for emitting the light beam toward the storage medium, is detected, and the power of the light beam from the semiconductor laser is controlled in the same manner as the front monitor method. Generally, the rear monitor method is known as being unsatisfactory in the light beam detection accuracy, and hence the front monitor method has been broadly adopted.

FIG. 14 shows a schematic configuration of an optical pickup device according to a conventional front monitor method. A light beam emitted from a semiconductor laser 1 is converted into the parallel light by a collimator lens 2 and supplied to a beam splitter 4 via a grating 3. The grating 3 separates the incident light beam into three beams, i.e., a main-beam used for reading out information from the optical disc 8 and two sub-beams used for a tracking serve control. The beam splitter 4 includes a reflection film 5 which transmits approximately 90% of the light beam from the semiconductor laser 1 and reflects the remaining approximately 10% of the light beam. Namely, by the function of the reflection film 5, approximately 90% of the light beam supplied to the beam splitter 4 is transmitted therethrough to be guided to a 1/4 wavelength plate 6, and the remaining approximately 10% of the light beam is reflected by the reflection film 5 to be guided to a condensing lens 12. The light beam guided to the 1/4 wavelength plate 6 is converged on a recording surface of an optical disc 8 by means of an objective lens 7, thereby to form beam spots of predetermined sizes.

The light beams irradiated on the recording surface of the optical disc 8 are reflected by the surface and travels to the reflection film 5 of the beam splitter 4 via the objective lens 7 and the 1/4 wavelength plate 6. Since the reflection film 5 has a property to reflect approximately 100% of the light beam from the direction of the optical disc 8, the light beam incident upon the reflection film 5 is guided to the light receiving element 11 via a condenser lens 9 and a cylindrical lens 10 for giving astigmatism to the light beam. On the other hand, the approximately 10% of the light beam emitted from the semiconductor laser 1 and reflected by the reflection film 5 of the beam splitter 4 is converged on a front monitor detector 13 by a condenser lens 12. The front monitor detector 13 outputs an electric signal depending upon the quantity of the light beam irradiated thereon, and the electric signal is supplied to an automatic power control (APC) circuit 14 including a laser control circuit which controls the power of the semiconductor laser 1. The APC circuit 14 derives an appropriate drive signal for driving the semiconductor laser 1 in accordance with the electric signal from the front monitor detector 13, and supplies the drive signal to the semiconductor laser 1. Thus, the output power of the semiconductor laser 1 is controlled by the drive signal generated by the APC circuit 14 based on the electric signal outputted from the front monitor detector 13.

In order to reduce the load on the semiconductor laser, reduce the power consumption of the semiconductor laser or obtain high laser power output at the time of recording processing, it is preferred to enhance the efficiency in use of the light beam emitted from the semiconductor laser. However, the pickup device employing the conventional front monitor method described above is designed such that the approximately 10% of the light beam emitted from the semiconductor laser 1 and supplied to the beam splitter 4 is necessarily guided to the front monitor detector 13. In other words, approximately 10% of the light beam incident upon the reflection film is reflected without exception. Therefore, the efficiency in use of the light beam is degraded.

Further, the reflective and transmissive property of the reflection film provided in the beam splitter may have irregularity within about ±5% from product to product, and hence, if the reflectance is designed to be 10%, the reflectance of the actual product may greatly vary within the range from 5% to 15%. Therefore, the gain control of the APC circuit must be carried out for every product, thereby deteriorating the production efficiency. Furthermore, it is known that the reflectance and/or transmittance of the reflection film in the beam splitter may vary dependently upon the ambient humidity. Therefore, the conventional front monitor method, which relies on the property of the beam splitter in controlling the output power of the semiconductor laser 1, is unsatisfactory in its reliability.

SUMMARY OF THE INVENTION

The present invention is contrived in view of the above mentioned problems, and it is an object of the present invention to provide an optical pickup device capable of enhancing the efficiency in use of the light beam and stably performing the power control of the semiconductor laser without being affected by the irregularity and/or the humidity-dependent variation of the property of the reflection film employed in the beam splitter.

According to one aspect of the present invention, there is provided a pickup device including: a light source for emitting a light beam; an optical system for separating the light beam into a main-portion and a sub-portion, and for guiding the main-portion of the light beam to an information storage medium; a monitor detector for receiving the sub-portion of the light beam and for outputting a detection signal; and a controller for controlling an output power of the light beam emitted by the light source based on the detection signal.

In accordance with the optical pickup thus configured, a light beam is emitted by the light source. The optical system separates the light beam into a main-portion and a sub-portion, and guides the main-portion of the light beam to an information storage medium. The monitor detector receives the sub-portion of the light beam and outputs a detection signal. Then, the controller controls the output power of the light beam emitted by the light source based on the detection signal. Thus, the light beam of the sub-portion, which is not generally used as a light beam to be irradiated on a storage medium, can be efficiently used, and hence the output power of the light beam from the light source may be controlled with high accuracy.

Preferably, the main-portion is a center portion of the light beam and the sub-portion is a portion of the light beam other than the main portion.

The optical system may include an interrupting member for partially interrupting the light beam from the light source and passing only the main-portion and the sub-portion of the light beam. Thus, it is possible to prevent unnecessary light component from entering the monitor detector. As an example, the interrupting member may include a first aperture for passing the main-portion of the light beam and at least one second aperture for passing the sub-portion of the light beam.

Preferably, the pickup device may further include a casing for covering a light emitting part of the light source to receive whole portion of the light beam emitted by the light source, wherein the interrupting member is disposed on the casing at a position 5receiving the light beam from the light source. By this, the more reliable interruption of the unnecessary light beam is ensured.

In a preferred embodiment, the optical system may include a collimator lens, wherein the collimator lens includes a miniature convex lens formed at an edge part thereof and for directing the sub-portion of the light beam to the monitor detector. Similarly, the optical system may include a collimator lens, wherein the collimator lens includes two miniature convex lenses formed at edge parts thereof opposing to each other, and the two convex lenses directs the sub-portions of the light beams to the monitor detector.

In another preferred embodiment, the optical system may include a diffraction grating having a first grating pattern for directing the main-portion of the light beam to the storage medium and a second grating pattern for directing the sub-beam to the monitor detector. Further, the second grating pattern may be configured to direct all component of the light beam other than the main-portion to the monitor detector as the sub-portion of the light beam.

In still another preferred embodiment, the optical system may include a beam splitter having a light receiving surface and a light reflecting surface, wherein the light receiving surface guides the main-portion of the light beam to the storage medium and the light reflecting surface reflects the sub-portion of the light beam to the monitor detector.

The monitor detector may include two detection elements each for outputting an electric signal corresponding to a quantity of light received, and an adder for adding two electric signals to produce the detection signal.

According to another aspect of the present invention, there is provided a pickup device for irradiating a main-portion of a light beam emitted from a light source on a storage medium, including: a light detector for receiving a sub-portion of the light beam which is a portion other than the main-portion of the light beam emitted by the light source and outputting a detection signal; and an adjusting unit for adjusting a power of the light beam emitted by the light source based on the detection signal.

In accordance with the pickup device thus configured, the light beam of the sub-portion, which is not generally used as a light beam to be irradiated on a storage medium, can be efficiently used, and hence the output power of the light beam from the light source may be controlled with high accuracy.

The pickup device may further include a separating unit for separating the light beam emitted by the light source into the main-portion to be irradiated on the storage medium and the sub-portion to be guided to the light detector. Thus, the sub-portion of the light beam can be efficiently guided to the monitor detector. In addition, the separating unit may reform the shape of the main-portion of the light beam. By this, the light beam can be irradiated on the storage medium with high accuracy.

In a preferred embodiment, the main-portion of the light beam may include a center portion of the light beam, wherein the sub-portion of the light beam includes a component of the light beam positioned outside of the main-portion, and the pickup device further including a changing unit for changing the optical path of the sub-portion of the light beam to the light detector. Thus, the optical path of the main-portion of the light beam can be separated from the optical path of the sub-portion of the light beam, thereby facilitating the design of the optical system.

In a specific embodiment, the light detector may include at least two detection elements, each of the detection elements receiving the sub-portion of the light beam at the position sandwiching the main-portion of the light beam in a symmetrical manner. This enables downsizing of the optical pickup.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

1st Embodiment

Figure 1:
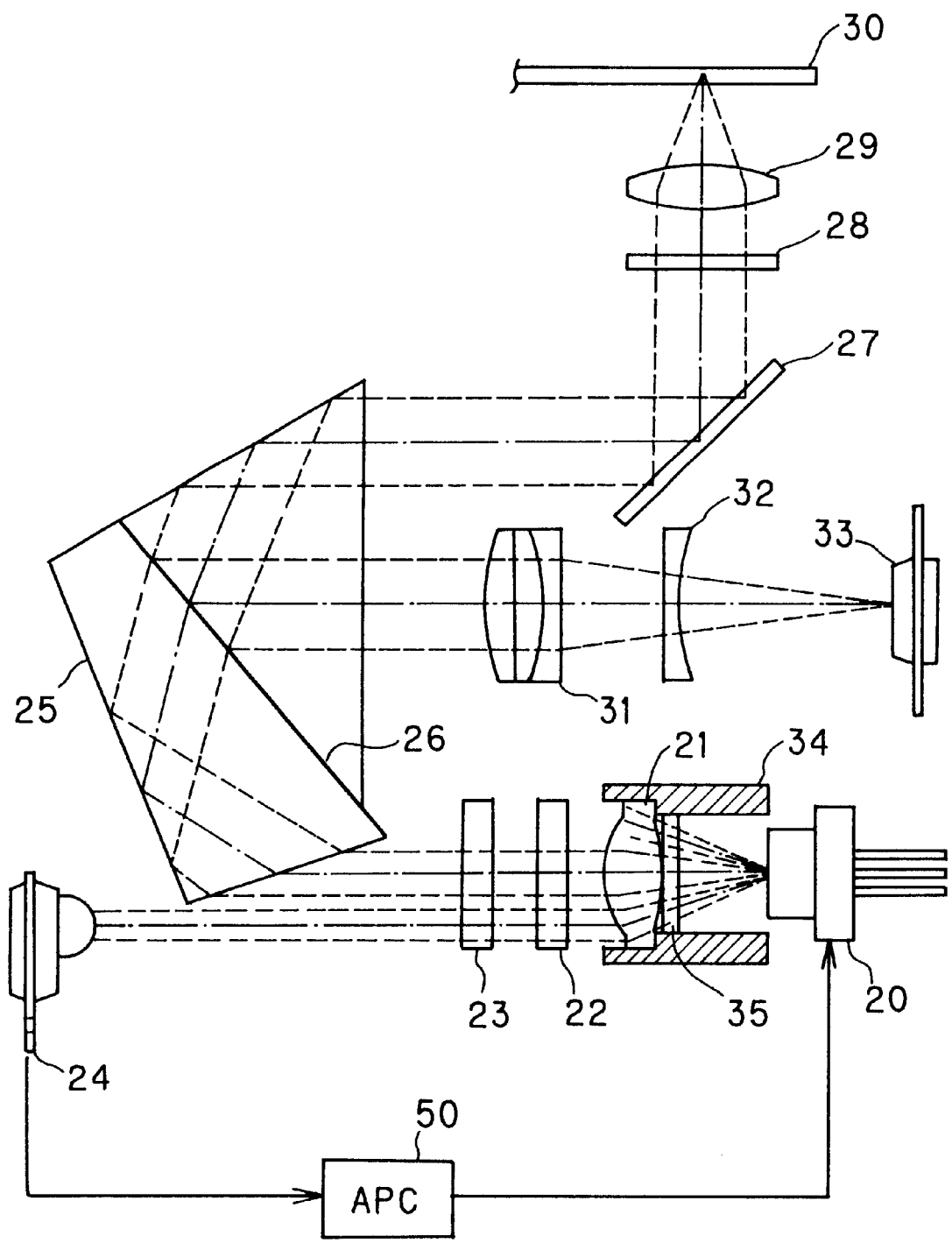
FIG. 1 is a diagram showing a schematic configuration of an optical pickup device according to a first embodiment of the present invention.

First, an optical pickup device according to the first embodiment of the present invention will be described. FIG. 1 shows the configuration of the optical pickup device according to the first embodiment. As illustrated, the optical pickup device includes a semiconductor laser 20 for emitting a light beam, a collimator lens 21 for converting a divergent light into a parallel light, a 1/2 wavelength plate 22 for rotating the polarization direction of the incident linearly-polarized light by 90 degrees, a grating 23 utilizing the light diffraction, and front monitor detector 24 for detecting the light beam for the purpose of controlling the intensity of the light beam emitted from the semiconductor laser 20. Further, the pickup device includes a beam splitter 25 for separating the light beam into a transmitted light and a reflected light, a reflection mirror 27 for reflecting the light beam, and a 1/4 wavelength plate 28 for converting the incident light into either a linearly-polarized light or a circularly-polarized light. Furthermore, the optical pickup includes an objective lens 29 for converging the light beam onto the recording surface of the optical disc, a condenser lens 31 for condensing the light beam, a cylindrical lens 32, a light receiving element 33 for receiving the light beam, and an APC circuit 50 for automatically controlling the output power of the semiconductor laser 20. The reference numeral 30 denotes the optical disc, only a part of which is illustrated in FIG. 1.

Next, the operation of the optical pickup device of the first embodiment will be described below. The light beam emitted from the semiconductor laser 20, serving as a light source, is masked by a lens holder 34 and an aperture limiting member 35, and only necessary portion of the light beam enters the collimator lens 21. The lens holder 34 and the aperture limiting member 35 are provided to mask the stray light. The light beam passed through the non-masked area is supplied to the 1/2 wavelength plate 22, which rotates the vibration direction of the light beam by 90 degrees, and then the light is guided to the grating 23. A main part of the light beam passed through the grating 23 is guided to the beam splitter 25 and remaining part thereof is guided to the front monitor detector 24. The aperture limiting member 35 may be made of plastic material and the like. The aperture limiting member 35 may be formed as a single unit integrated with the lens holder 34, and in that case it may be made of the same material as that of the lens holder 34, for example, brass.

The grating 23 separates the light beam into three beams in total, i. e., a main-beam used for reading out information from the optical disc 30 and two sub-beams used for the tracking servo control. The beam splitter 25 is provided with the reflection film 26, which has a property to transmit the light beam of P-polarized light, for example, emitted from the semiconductor 20 and polarized by the 1/2 wavelength plate 22 with a transmission rate of approximately 100% and reflect the light beam reflected by the optical disc 30 and converted into S-polarized light with the reflection rate of approximately 100%. The light beam of P-polarized light emitted from the semiconductor laser 20 is guided to the beam splitter 25, which changes the polarization plane of the light beam from an elliptical shape to a circular shape. The circularly-polarized light beam thus produced is guided to the objective lens 29 via the reflection film 26, the reflection mirror 27, and the 1/4 wavelength plate 28. The objective lens 29 converges the light beam onto the recording surface of the optical disc 30 to form beam spots.

The light beams converged on the recording surface of the optical disc are reflected by the recording surface and guided to the 1/4 wavelength plate 28 again via the objective lens 29. The light beam passed through the 1/4 wavelength plate 28 becomes the S-polarized light by the rotation of the polarization plane in the 1/4 wavelength plate 28, and is guided to the beam splitter 25 via the reflection mirror 27. The light beam of S-polarized light guided to the beam splitter 25 is reflected by the reflection film 26 and guided to the light receiving element 33 via the condenser lens 31 and the cylindrical lens 32. The light receiving element 33 produces an electric signal in proportion to the quantity of light beam received, and supplies it to a signal processor (not shown) of a following stage. The signal processor demodulates information recorded on the optical disc 30, and generates a focus error signal which is used to make the light beam on the recording surface of the optical disc 30 in focus and a tracking error signal which is used to appropriately position the light beam with respect to the tracks on the optical disc 30.

A part of the light beam, which has passed through the collimator lens 21 but is not guided to the beam splitter 25, is guided to the front monitor detector 24 via the 1/2 wavelength plate 22 and the grating 23. The front monitor detector 24 receives the part of the light beam to detect the power intensity of the light beam, and converts the detected intensity amount into an electric signal to be supplied to the APC circuit 50. The APC circuit 50 compares the electric signal supplied from the front monitor detector 24 with a predetermined reference value to generate an adjustment signal depending on the difference obtained by the comparison, and supplies it to the semiconductor laser 20. The semiconductor laser 20 controls the power intensity of the light beam emitted therefrom based on the adjustment signal supplied from the APC circuit 50. Namely, the semiconductor laser 20 determines the output power of the light beam such that the difference between the electric signal outputted by the front monitor detector 24 and the reference value becomes zero. By this control, the power intensity of the light beam emitted from the semiconductor laser 20 is constantly maintained to be an appropriate value.

Figure 2A:
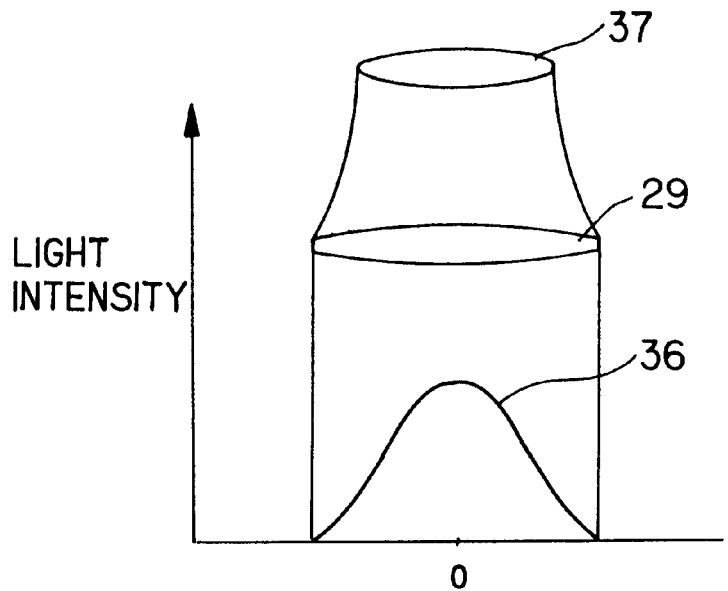
FIGS. 2A and 2B are diagrams showing the Gaussian distribution of a light beam emitted from a semiconductor laser and the formation of beam spot by converging the light beam.
Figure 2B:
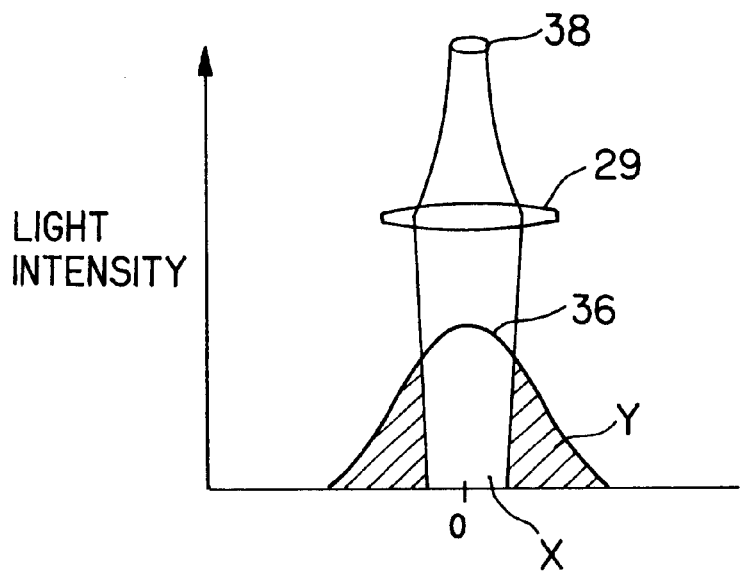

Next, the light beam emitted from the semiconductor laser 20 will be discussed with reference to FIGS. 2A and 2B. It is known that the intensity distribution of the light beam emitted from the semiconductor laser 20 approximately takes the form of Gaussian distribution 36, as shown in FIG. 2A, wherein substantially even or uniform intensity level, i.e., plane-wave like distribution is obtained at the center portion of the light beam. In order to enhance the efficiency in use of the light beam, it is ideal that all of the light beam emitted from the semiconductor laser is supplied to the optical disc 30. However, if not only the central portion but also the circumferential portion of the light beam is converged by the objective lens 29 having a large aperture, the wavefront radius of curvature of the light beam incident upon the objective lens 29 becomes small. Therefore, the diameter of the beam spot cannot be made small like the beam spot 37 shown in FIG. 2A, and the desired small beam spot diameter cannot be achieved. Therefore, as seen in FIG. 2B, generally, only the central portion of the light beam, i.e., the main-area X of the light beam where substantially plane wave like distribution (the wavefront radius of curvature is infinity) can be obtained is converged by the objective lens 29 to form the beam spot 38 of small spot diameter, though the loss of light increases. It is noted that the quantity of the light beam in the main-area X is approximately 50% of total light quantity, and hence the ratio of the light quantities of the main area X and the area other than the main area X (hatched area in FIG. 2B, hereinafter referred to as "sub-area Y") is approximately 1:1.

Figure 3A:
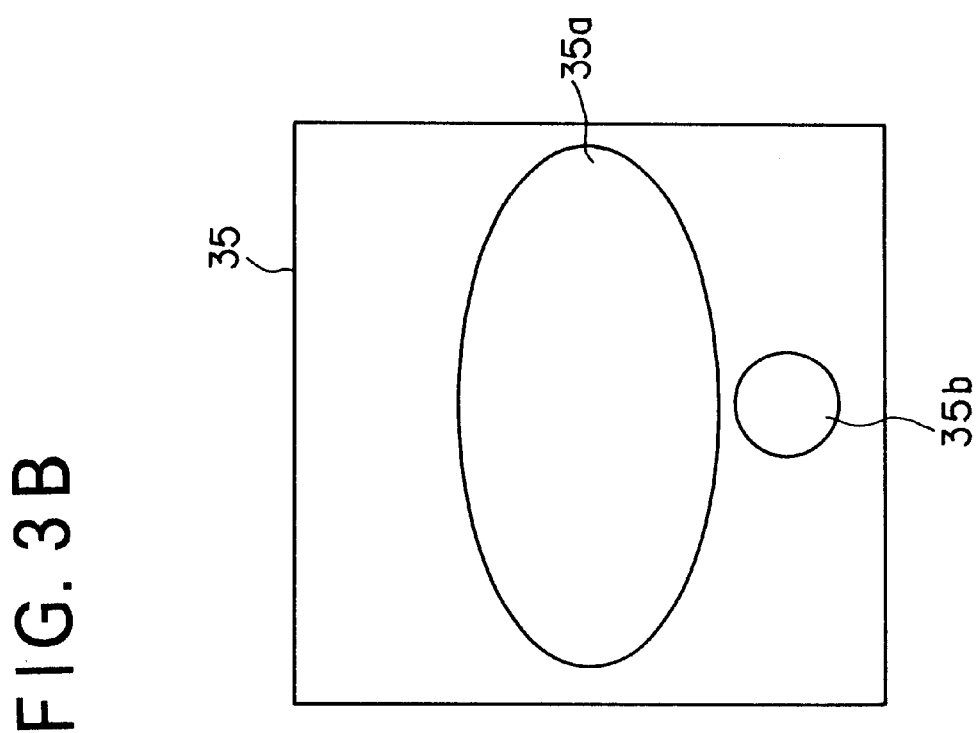
FIG. 3A is a perspective view of a collimator lens used in the first embodiment of the present invention from the direction of a semiconductor laser.
Figure 3B:
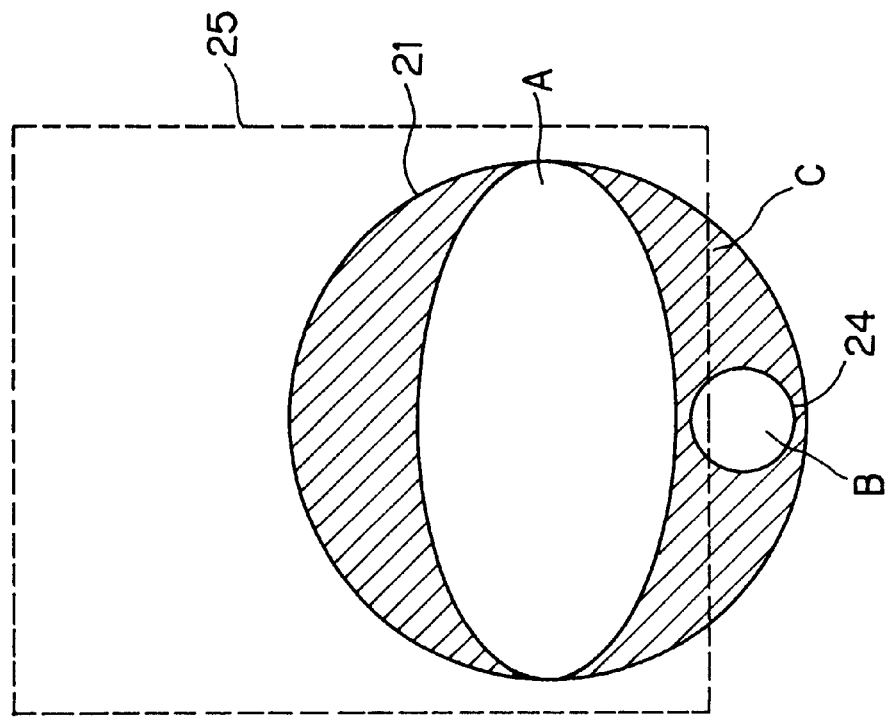
FIG. 3B shows the shape of an example of an aperture limiting member used in the first embodiment.

FIG. 3A schematically shows positional relationship of the collimator lens 21 and the beam splitter 25 viewed from the direction of the semiconductor laser 21, and FIG. 3B shows the shape of an example of the aperture limiting member 35. The light beam from the semiconductor laser 20 passes through the aperture limiting member 35 shown in FIG. 3B and is irradiated on the collimator lens 21. As shown in FIG. 3A, the collimator lens 21 can be classified into three areas, i.e., a first area A of elliptic shape at the center, a second area B, and a hatched third area C. In the first area A, out of the light beam emitted from the semiconductor laser 20, the light beam of the main area X described above and passed through the aperture 35a of the aperture limiting member 35 enters the collimator lens 21. The light beam of the main area X passed through the aperture limiting member 35 and the first area A of the collimator lens 21 impinges on the beam splitter 25, travels to the objective lens 29 and converges on the recording surface of the optical disc 30 to form a beam spot. Through the second area B, the light beam of the sub-area Y passes. The sub-area Y is located outside of the main area X as shown in FIG. 2. Out of the light beam emitted from the semiconductor laser 21, the light beam of the sub-area Y passes through the aperture 35b of the aperture limiting member 35 and the second area B, and travels to the front monitor detector 24. The third area C is an area where the light beam emitted from the semiconductor laser 20 is interrupted, and hence no light beam is irradiated. As shown in FIG. 3B, the aperture limiting member 35 is shaped to interrupt the light beam at the third area C other than the first area A and the second area B so as to prevent the unnecessary light beam from entering the objective lens 29 and the front monitor detector 24.

As described above, in the optical pickup device of the first embodiment of the present invention, an outer circumferential portion of the light beam emitted from the semiconductor laser is directly guided to the front monitor detector 24 without passing through the reflection film 26 of the beam splitter 25. Therefore, the light beam is stably irradiated on the front monitor detector 24 without being affected by the irregularity in property of the reflection film and/or the change of the property due to the humidity variation. Since the front monitor detector 24 stably receives the light beam, it can stably output the electric signal to the APC circuit 50. Hence, the intensity of the light beam emitted from the semiconductor laser 20 can be stably controlled. Further, since the unnecessary light beam is interrupted by the aperture limiting member 35 and the lens holder 34, it is not irradiated on the front monitor detector 24, and the detection signal including less noise is obtained. Therefore, the APC circuit 50 can control the power intensity of the light beam emitted from the semiconductor laser 20 constantly to be an optimum value.

While the optical pickup of the first embodiment described above is provided with the 1/2 wavelength plate 22 which changes the polarization direction by 90 degrees, it may be omitted if an appropriate design is made. The 1/2 wavelength plate 22 is provided in consideration of the shaping direction of the beam splitter 25 for shaping the polarization plane of the light beam emitted from the semiconductor laser 20, the polarization direction of the light beam, and the incident direction of the light beam onto the reflection film 26 of the beam splitter 25. However, by using a semiconductor laser 20 of certain property or by appropriately arranging the respective optical elements, the same result may be obtained without employing the 1/2 wavelength plate 22.

2nd Embodiment

Figure 4:
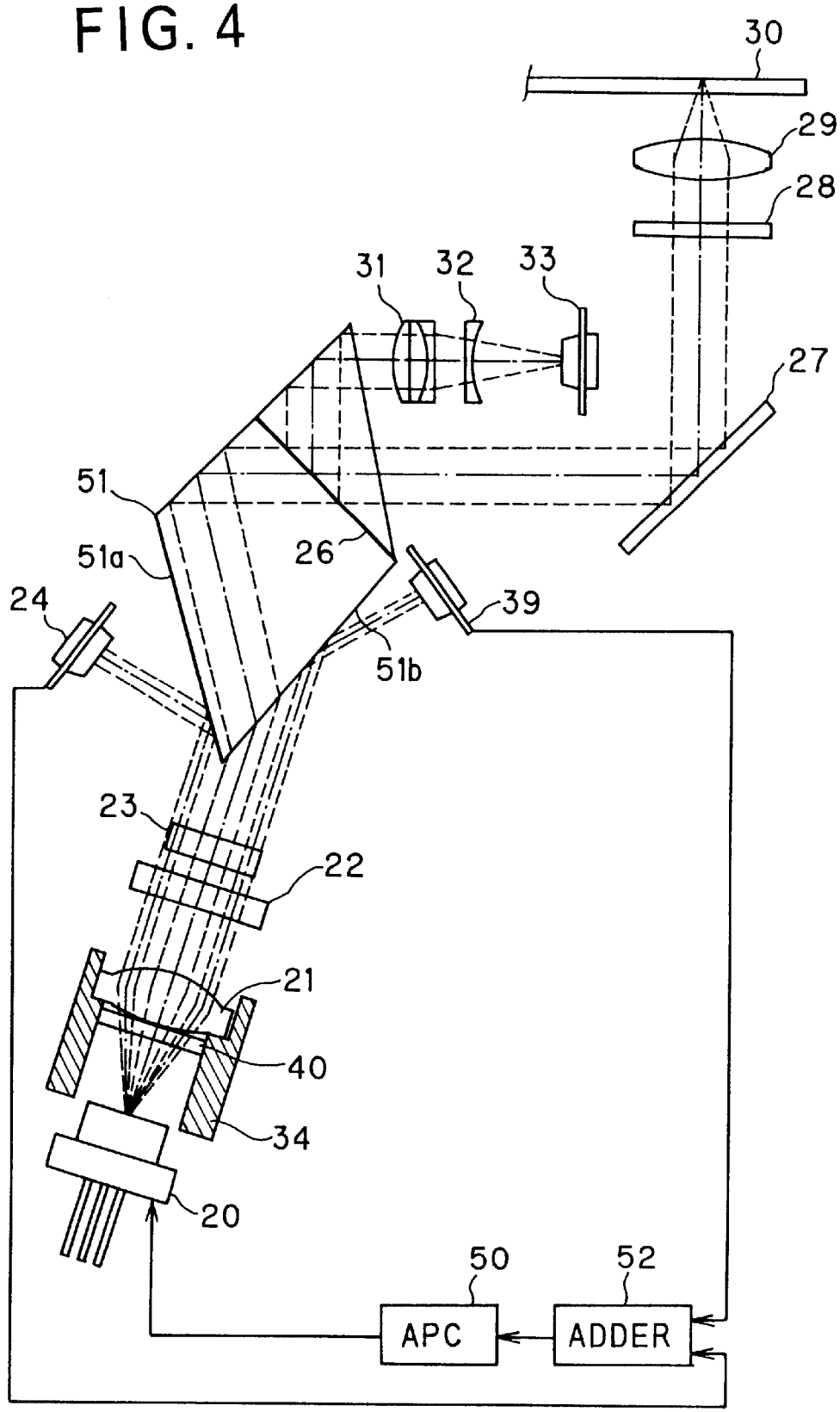
FIG. 4 is a diagram showing a schematic configuration of an optical pickup device according to a second embodiment of the present invention.

Next, the second embodiment of the present invention will be described with reference to FIGS. 4, 5A and 5B. FIG. 4 shows the configuration of the optical pickup device of the second embodiment. In the second embodiment, two front monitor detectors are provided to increase the total light quantity of the light beam received by the front monitor detectors in comparison with the first embodiment. The second embodiment differs from the first embodiment in the following points. First, two front monitor detectors 24 and 39 are provided. Second, the beam splitter 51 is provided with the reflection mirrors 51a and 51b which reflect the light beam to be guided to the front monitor detectors 24 and 39, respectively. Third, the shape of the aperture limiting member 40 in front of the collimator lens 21 is modified. In other points, the second embodiment is identical to the first embodiment, and hence the same elements are applied with the same reference numbers and their explanation will be omitted.

Out of the two surfaces of the beam splitter 51 confronting the semiconductor laser 20, one surface (on the left side of the beam splitter 51 in FIG. 4) is provided with a first reflection mirror 51a, and the other surface (on the right side of the beam splitter 51) is provided with a second reflection mirror 51b. The reflection mirrors 51a and 51b are formed by depositing metal material such as aluminum on the surfaces of the beam splitter 51. A part of the light beam from the collimator lens 21 is reflected by the first reflection mirror 51a and guided to the front monitor detector 24, and another part of the light beam from the collimator lens 21 is reflected by the second reflection mirror 51b and guided to the front monitor detector 39. The remaining major part of the light beam from the collimator lens 21 enters the beam splitter 51 because the reflection mirror is not provided between the first and the second reflection mirrors 51a and 51b. Thus, the beam splitter 51 separates the light beam and changes the path of the light beam such that the light beam of the main area X is guided to the optical disc 30 and the light beams of the sub-areas are guided to the front monitor detectors 24 and 39.

Figure 5B:
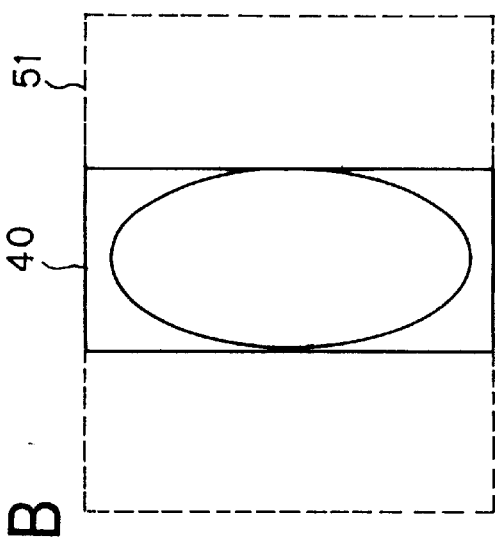
FIGS. 5B and 5D show the shapes of examples of the aperture limiting member according to the second embodiment.
Figure 5D:
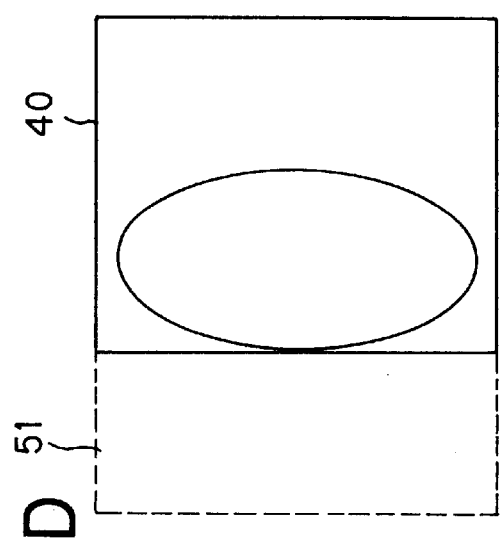
Figure 5A:
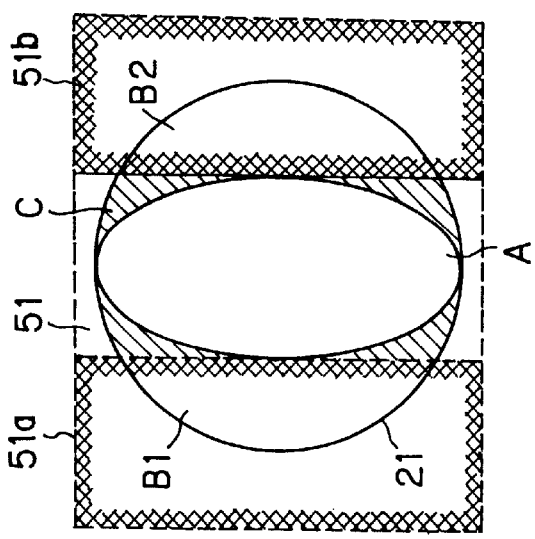
FIGS. 5A and 5C are perspective views of the collimator lens and the beam splitter, viewed from the side of the semiconductor laser, according to the second embodiment of the present invention.
Figure 5C:
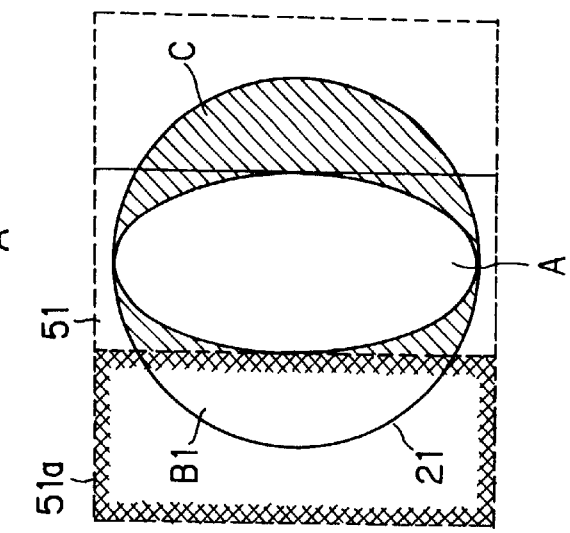

FIG. 5A is a perspective view of the collimator lens 21 and the beam splitter 51 employed in the optical pickup device of the second embodiment viewed from the side of the semiconductor laser 20, and FIG. 5B shows the shape of an example of the aperture limiting member 40. In FIG. 5A, the beam splitter 51 has the first reflection mirror 51a on the left side and the second reflection mirror 51b on the right side. An aperture limiting member 40 of the shape shown in 5B, for example, is provided in front of the collimator lens 21 to interrupt the light beam from the semiconductor laser 20. Therefore, the light beam passed through the aperture limiting member 40 enters at the first area A, the second area B1 and the second area B2 shown in FIG. 5A. However, no light beam enters the hatched area C of the collimator lens because the light beam is interrupted by the aperture limiting member 40 shown in FIG. 5B.

The light beam passed through the first area A is treated in the similar manner to that in the first embodiment, and hence the description thereof will be omitted. The light beam of the sub-area Y, passed through the second area B1 of the collimator lens 21, is reflected by the first reflection mirror 51a, and is guided to the front monitor detector 24 which is disposed on the optical axis of the reflected light beam. Namely, the second area B1 is an area where the light beam to be guided to the front monitor detector 24 passes. Similarly, the light beam of the sub-area Y, passed through the second area B2, is reflected by the second reflection mirror 51b, and is guided to the front monitor detector 39 which is disposed on the optical axis of the reflected light beam. Namely, the second area B2 is an area where the light beam to be guided to the front monitor detector 39 passes.

The third area C is an area where no light beam is irradiated on the collimator lens 21, because, out of the light beam emitted by the semiconductor laser 20, only the component passed through the aperture limiting member 40 shown in FIG. 5B is irradiated on the beam splitter 51.

The light beam of the main area X, passed through the first area A of the collimator lens 21, impinges upon the area of the beam splitter 51 where no reflection mirror is provided, and enters the inside of the beam splitter 51. Then, the light beam is converged by the objective lens 29 on the recording surface of the optical disc 30 to form a beam spot thereon. The light beam passed through the second area Bi of the collimator lens 21 is totally reflected by the first reflection mirror 51a and supplied to the front monitor detector 24. The light beam passed through the second area B2 of the collimator lens 21 is totally reflected by the second reflection mirror 51b and supplied to the front monitor detector 39.

The output signals from the front monitor detectors 24 and 39 are added to each other by the adder 52, and is supplied to the APC circuit 50. The APC circuit compares the electric signal from the adder 52 with a predetermined reference value to generate the adjustment signal indicative of the difference between the electric signal and the reference value, and supplies it to the semiconductor laser 20. The semiconductor laser 20 controls the power intensity of the light beam based on the adjustment signal supplied from the APC circuit 50 such that the power intensity of the light beam emitted from the semiconductor laser 20 constantly becomes an optimum value.

As described above, the optical pickup device of the second embodiment is provided with two front monitor detectors, and the output signals from them are added to each other by the adder 50 and then supplied to the APC circuit 50. As a result, the total quantity of light received by the front monitor detectors is increased, and the accuracy in controlling the power intensity of the emitted light beam can be improved.

While the optical pickup device of the second embodiment described above is provided with two front monitor detectors, only one front monitor detector may be employed. In that case, the second area B2 of the collimator lens 21 shown in FIG. 5A is also masked by the aperture limiting member 40 shown in FIG. 5D. In that case, the other configuration is identical to the above described second embodiment, and hence the description thereof will be omitted.

Sometimes, the surface of the beam splitter 51 is provided with a coating so-called AR (Anti-Reflection) coating. This AR coating is made by applying a material such as silicon on an optical element such as the beam splitter. With the AR coating, the transmittance of the light beam can be improved compared with the case in which no such coating is made. However, the AR coating has such property that its transmittance or reflectance varies as the humidity and/or temperature varies. Therefore, if the whole surface of the beam splitter 51, including the reflection mirrors 51a and 51b, are applied with the AR coating and the light beam is reflected by the reflection mirrors 51a and 51b toward the front monitor detectors 24 and 39, the quantity received by the front monitor detectors 24 and 39 may vary according to the variation of humidity and/or temperature. In addition, the quantity of light guided to the front monitor detectors 24 and 39 is smaller than the quantity of light guided to the optical disc 30, and hence the variation of such small quantity of light greatly affects the control of the power intensity of the semiconductor laser 20. In this view, it is preferred that the beam splitter 51 is made of material, such as glass, which reflectance is not sensitive to humidity and/or temperature variation, and the AR coating is not applied to at least the reflection mirrors 51a and 51b for reflecting the light beam toward the front monitor detectors 24 and 39. By this, a stable quantity of light is supplied to the front monitor detectors even if humidity and/or temperature varies. Further, while the above embodiment uses the reflection mirrors 51a and 51b with no coating on the surface thereof, certain material which is not sensitive to the variation of humidity and/or temperature may be coated on the surface of the reflection mirrors 51a and 51b.

3rd Embodiment

Figures 6A, 6B:
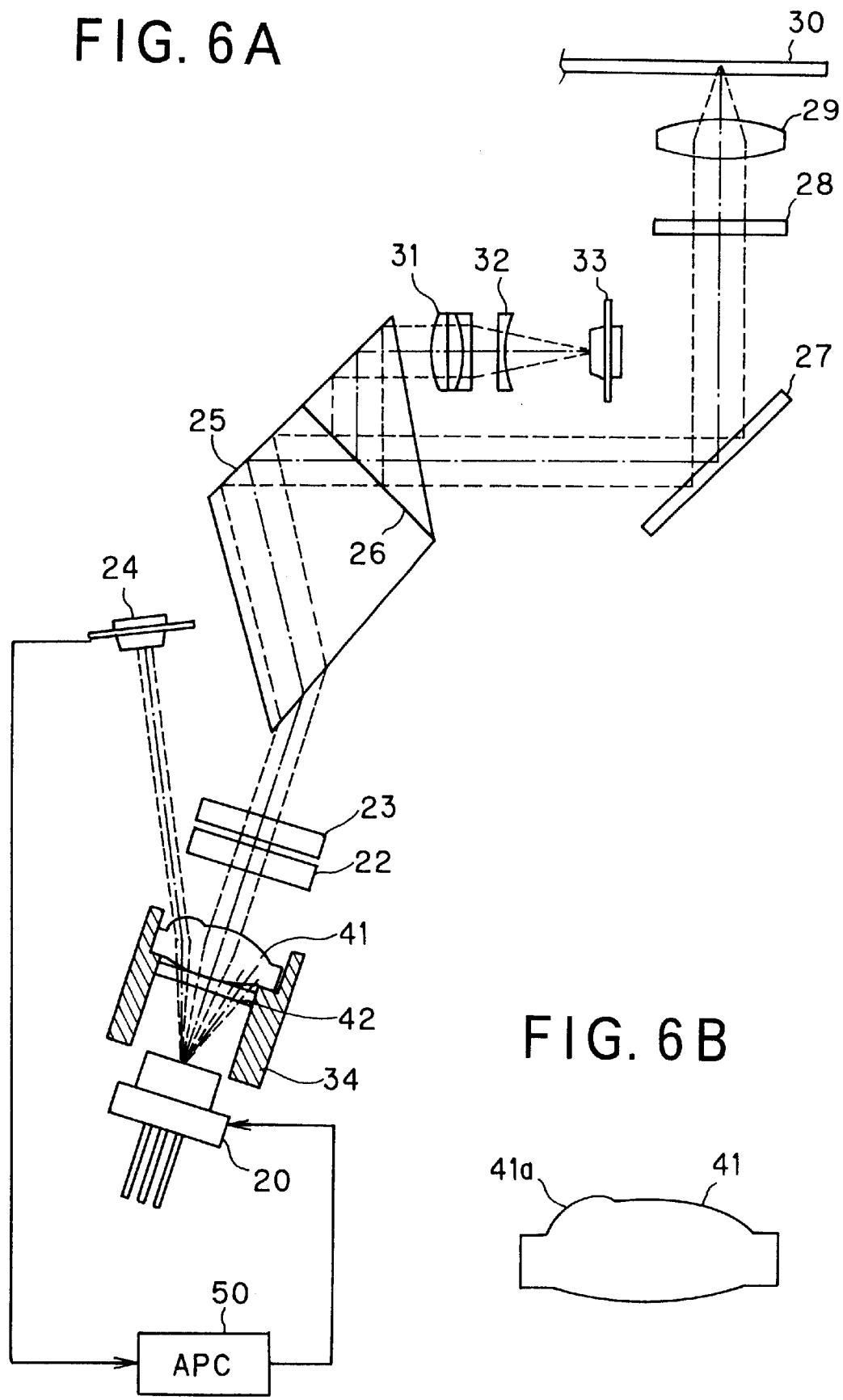
FIG. 6A is a diagram showing a schematic configuration of an optical pickup device according to a third embodiment of the present invention.
FIG. 6B is a sectional view of the collimator lens used in the optical pickup device shown in FIG. 6A.

Next, the third embodiment of the present invention will be described with reference to FIGS. 6A, 6B and 7A to 7D. FIG. 6A shows a configuration of the optical pickup device according to the third embodiment of the present invention. The third embodiment differs from the first embodiment in the shape of the collimator lens which separates a part of the light beam incident thereon and changes its optical path to the direction of the front monitor detector. FIG. 6B shows the section of the collimator lens 41 which is provided with a miniature convex lens 41a at one side on its surface. The collimator lens 41 used in this embodiment separates a part of the light beam by the miniature convex lens 41a and changes the optical path of the part of the light beam to be guided to the front monitor detector 24.

Figure 7A:
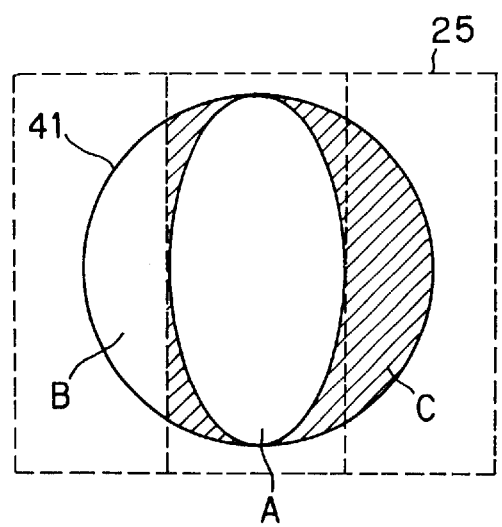
FIGS. 7A and 7C are perspective views of the collimator lens and the beam splitter, viewed from the side of the semiconductor laser, according to the third embodiment of the present invention.
Figure 7B:
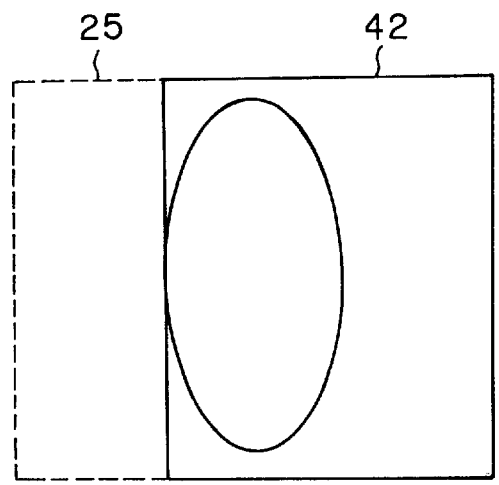
FIG. 7B shows the shape of an example of the aperture limiting member according to the third embodiment.

FIG. 7A is a perspective view of the collimator lens 41 with the miniature convex lens 41a viewed from the side of the semiconductor laser 20, and FIG. 7B shows an example of the aperture limiting member 42 provided in front of the collimator lens 41. The light beam emitted from the semiconductor laser 20 is irradiated on the aperture limiting member 42, which passes the light beam only in areas corresponding to the first area A and the second area B of the collimator lens 41. The collimator lens 41 receives the light beam in the first area A of elliptic shape at the center thereof and the second area B where the miniature convex lens 41a is formed. In the third area C represented by the hatching, no light beam is irradiated because the light beam is interrupted by the aperture limiting member 42 shown in FIG. 7B.

The first area A and the third area C are the same as those of the first embodiment, and hence the description thereof will be omitted. The second area B is an area where the miniature convex lens 41a is formed. The light beam of the sub-area Y passes through the miniature convex lens 41a and its optical path is changed to the direction of the front monitor detector 24. Namely, the light beam passed through the second area B, whose optical path is changed, is directly guided to the front monitor detector 24 without passing through any optical elements such as a 1/2 wavelength plate or a grating. Out of the light beam emitted from the semiconductor laser 20, the light beam of the main-area X, which passed through the first area A of the collimator lens 41 as shown in FIG. 7A, travels through the beam splitter 25 and is converged by the objective lens 29 to form the beam spot on the recording surface of the optical disc 30. Out of the light beam emitted from the semiconductor laser 20, the light beam passed through the miniature convex lens 41a of the collimator lens 41 is irradiated on the front monitor detector 24 due to the change of its optical path.

Figure 7C:
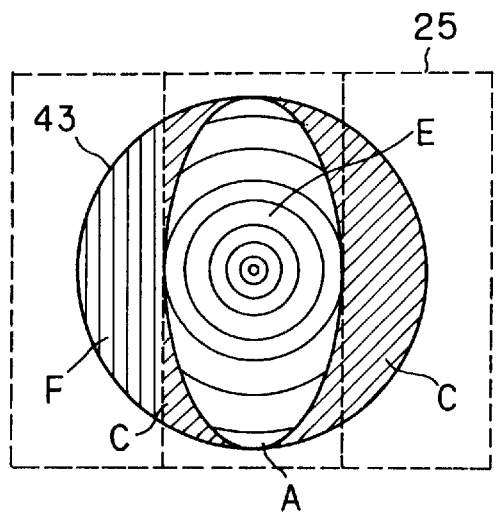

It is noted that, instead of forming the miniature convex lens 41a on the collimator lens 41, a hologram collimator lens 43 as shown in FIG. 7C may be used in place of the collimator lens 41. The hologram collimator lens 43 shown in FIG. 7C can be used in combination with the aperture limiting member 42 shown in FIG. 7B, so that the light beam from the semiconductor laser 20 impinges upon the hologram collimator 43 only in the areas A and B. The hologram collimator lens 43 is formed as a combination of different hologram patterns as seen in FIG. 7C. The center portion of the hologram lens 43 corresponding to the elliptical first area A is formed with the hologram pattern E including plural eccentric circular patterns with different pitches therebetween. The central hologram pattern E has a function to collimate the diverging light beam to a parallel light beam, i.e., the same function as a collimator lens. In addition, at the area corresponding to the second area B of the collimator lens 41 shown in FIG. 7A, a linear hologram pattern F is formed. The optical path of the light beam incident upon this linear hologram pattern F is changed by the hologram pattern F, and hence the hologram pattern F has the same function as the miniature convex lens 41a of the collimator lens 41. The third area C functions similarly to the first and the second embodiment, and hence the description thereof will be omitted.

As described above, the optical pickup device of the third embodiment is provided with the miniature convex lens 41a at one side of the surface of the collimator lens 41, or alternatively the hologram lens 43 having the hologram pattern F at a portion on the surface thereof. The light beam emitted from the semiconductor laser 20 and passed through either the second area B of the collimator lens 41 or the hologram pattern F of the hologram collimator lens 43 is separated from the light beam of the main-area X, and directed to the front monitor detector 24. Therefore, the optical path to the front monitor detector 43 can be designed without affecting the design of other optical systems, and the power intensity of the light beam emitted from the semiconductor laser 20 may be controlled to constantly maintain the optimum value. As a technique to obtain the light beam for the front monitor detector 24, the above description exemplified the provision of the miniature convex lens 41a on the collimator lens 41 or the provision of the hologram pattern F. However, the present invention is not limited to these examples. In another example, the aperture limiting member 42 for masking is positioned downstream of the collimator lens 41 and the hologram pattern F for changing the optical path may be provided on the grating 23. This may derive the same result.

4th Embodiment

Figure 8A:
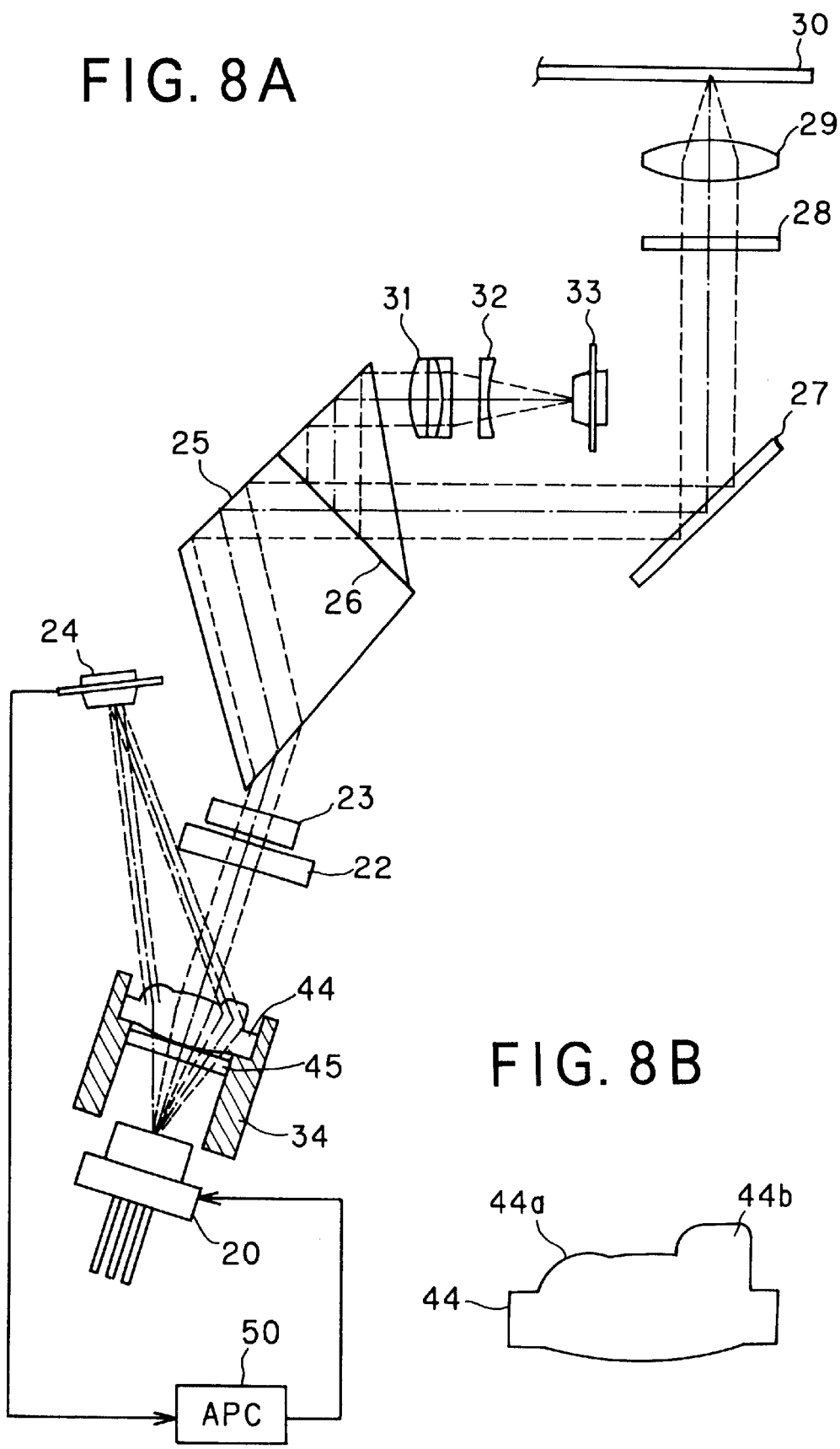
FIG. 8A is a diagram showing a schematic configuration of an optical pickup device according to a fourth embodiment of the present invention.
Figure 8B:
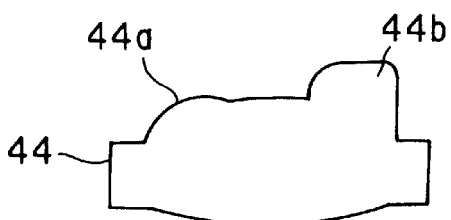
FIG. 8B is a sectional view of the collimator lens used in the optical pickup device shown in FIG. 8A.

Next, the fourth embodiment of the present invention will be described with reference to FIGS. 8A, 8B and 9A to 9C. FIG. 8A shows the configuration of the optical pickup device according to the fourth embodiment of the present invention. In this fourth embodiment, two miniature convex lenses 44a and 44b are provided on both sides on the surface of the collimator lens 44 thereby to increase the total quantity of light received by the front monitor detector 24. FIG. 8B shows the section of the collimator lens 44 with the miniature convex lenses 44a and 44b provided on both sides on its surface. The collimator lens 44 used in this embodiment separates two parts of the light beam and changes the optical paths of those separated parts of the light beams to be incident on the front monitor detector 24.

Figure 9A:
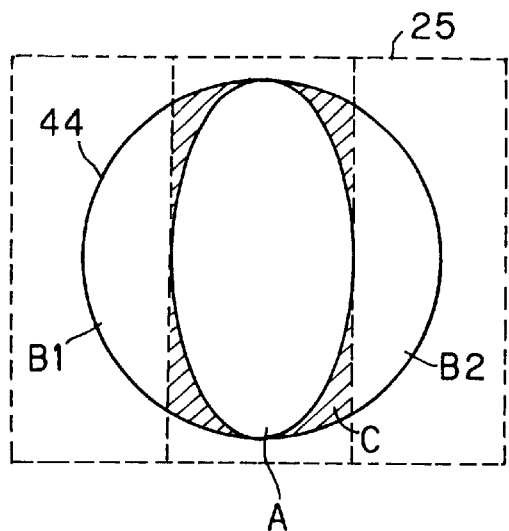
FIGS. 9A and 9C are perspective views of the collimator lens and the beam splitter, viewed from the side of the semiconductor laser, according to the fourth embodiment of the present invention.
Figure 9B:
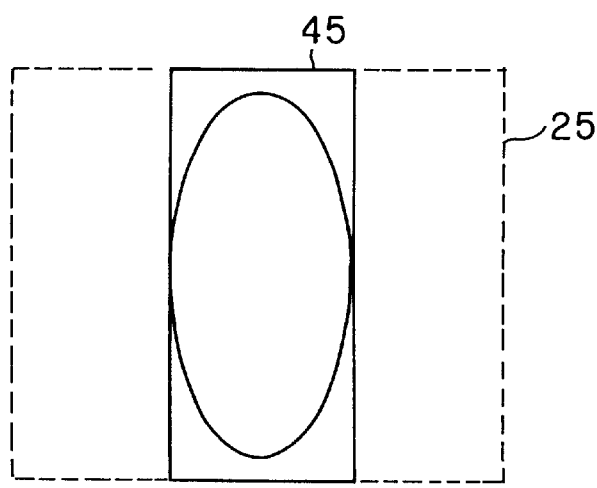
FIG. 9B shows an example of the aperture limiting member according to the fourth embodiment.

FIG. 9A is a perspective showing the collimator lens 44 with the miniature convex lenses viewed from the side of the semiconductor laser 20, and FIG. 9B shows the example of the aperture limiting member 45 provided in front of the collimator lens 44. The light beam emitted from the semiconductor laser 20 is partially interrupted by the aperture limiting member 45 shown in FIG. 9B, and impinges upon the collimator lens 44 in the first area A, the second area B1 and the second area B2. In the hatched third area C, no light beam impinges upon the collimator lens 44.

Since the first area A and the third area C are the same as those in the second embodiment, the description thereof will be omitted. The second areas B1 and B2, where the miniature convex lenses 44a and 44b are formed, respectively, separate the parts of the light beam and change the optical paths of those separated light parts toward the front monitor detector 24. Namely, the optical paths of the light beams passed through the second areas B1 and B2 are changed by the miniature convex lenses 44a and 44b, and those light beams are guided directly to the front monitor detector 24, without passing through any 1/2 wavelength plate or grating. Out of the light beam emitted from the semiconductor laser 20, the light beam of the main-area X passes through the first area A of the collimator lens 44 travels through the beam splitter 25 and is converged by the objective lens 29 on the recording surface of the optical disc 30 to form a beam spot. On the other hand, out of the light beam emitted from the semiconductor laser 20, two parts of the light beam passed through the miniature convex lenses 44a and 44b of the collimator lens 44 are irradiated on the front monitor detector 24.

Figure 9C:
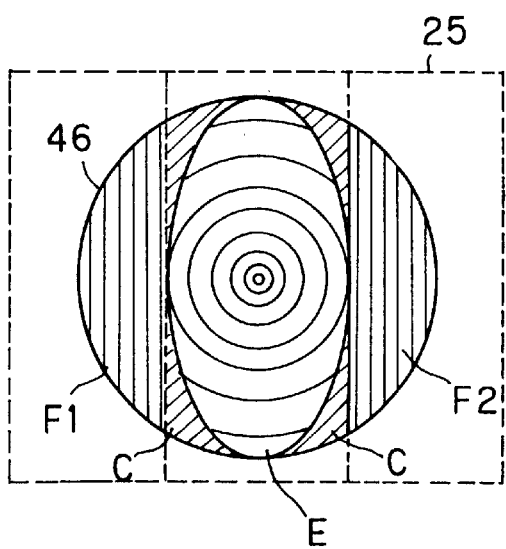

Instead of forming the miniature convex lenses 44a and 44b on the collimator lens 44, a hologram collimator lens 46 as shown in FIG. 9C may be used in combination with the same aperture limiting member 45 shown in FIG. 9B. The hologram collimator lens 46 shown in FIG. 9C is constituted as a combination of different hologram patterns. The central portion of the hologram collimator lens 46, corresponding to the first area A of the collimator lens 44, is formed with the hologram pattern E of concentric circular patterns with different pitches therebetween. The hologram pattern E has the same function as a collimator lens, i.e., collimating the diverging light beam into a parallel light beam. In the areas B1 and B2 shown in FIG. 9A, the linear hologram patterns F1 and F2 are formed. When the light beam impinges on the hologram patterns F1 and F2, the optical path is changed. Therefore, the hologram patterns F1 and F2 have the same function as the miniature convex lenses 44a and 44b. Since the third area C is the same as that in the first embodiment, the description thereof will be omitted.

As described above, the optical pickup device of the fourth embodiment is provided with the miniature convex lenses 44a and 44b at both sides on its surface, i.e., at the areas corresponding to the second areas B1 and B2, or alternatively provided with a hologram lens having the hologram patterns F1 and F2 for diffraction on its surface. The light beam emitted from the semiconductor laser 20 and passed through either the second areas B1 and B2 of the collimator lens 44 or the hologram patterns F1 and F2 of the hologram collimator lens 46 is separated from the light beam of the main-area X and is directly irradiated on the front monitor detector 24. Therefore, the optical path for the light beam to be irradiated on the front monitor detector may be designed without affecting other optical systems, and thereby the power intensity of the light beam emitted from the semiconductor laser 20 is constantly controlled to be an optimum value.

While the above embodiment exemplified, as a method of detecting the light beam for the front monitor detector 24, the provision of the miniature convex lenses 44a and 44b or the diffracting hologram patterns, the present invention is not limited to such feature. For example, the same result may be achieved by providing the aperture limiting member 45 downstream of the collimator lens 44 and providing the hologram pattern for the diffraction purpose on the grating 23. Thus, since the optical pickup device of the fourth embodiment has such a configuration that the light beam of the sub-areas Y, located on both sides of the main-area X, are guided to the front monitor detector 24, the quantity of the light received by the front monitor detector 24 is increased in comparison with the third embodiment, and hence the accuracy in controlling the power intensity of the light beam from the semiconductor laser can be improved. While the polarization beam splitter is used as the beam splitter 25, the present invention is not limited to this example. Namely, another optical element can be employed which may have the reflecting film for transmitting the light beam from the semiconductor laser 20 with a certain transmittance and reflecting the light beam with a certain reflectance.

5th Embodiment

Figure 10A:
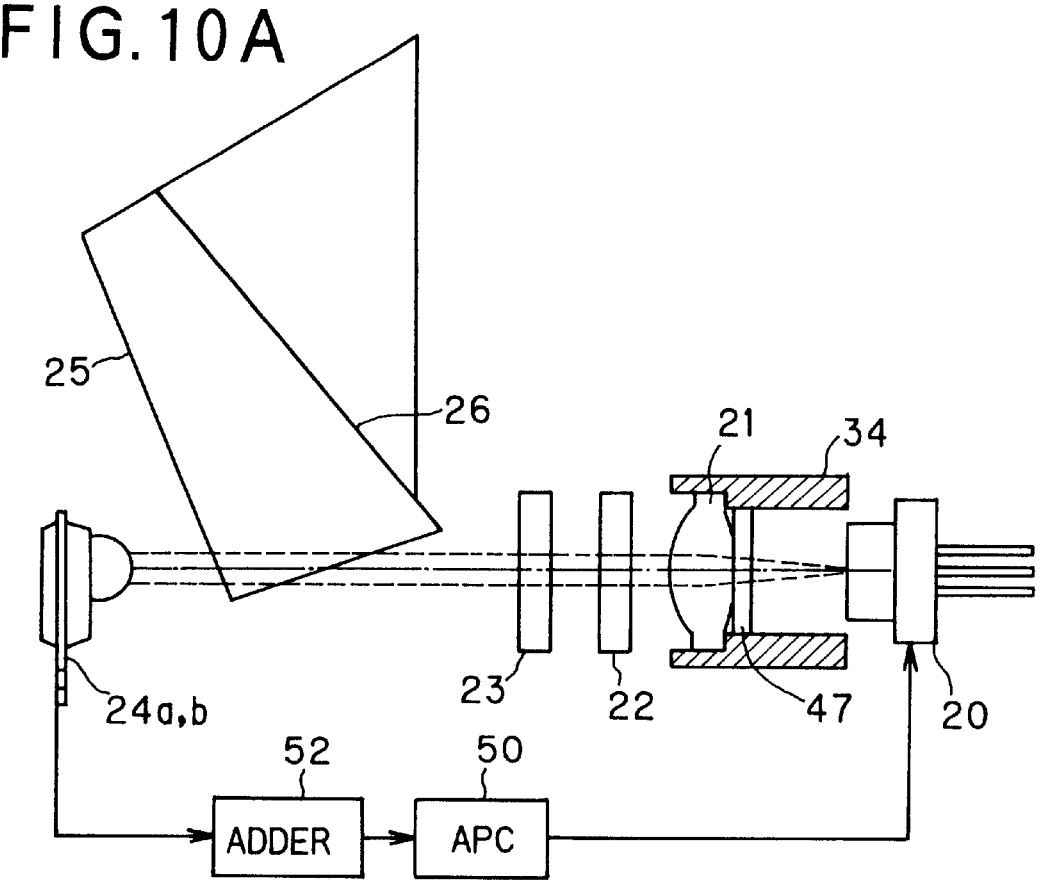
FIGS. 10A and 10B are a side view and a plan view showing a schematic configuration of an optical pickup device according to a fifth embodiment of the present invention.
Figure 10B:
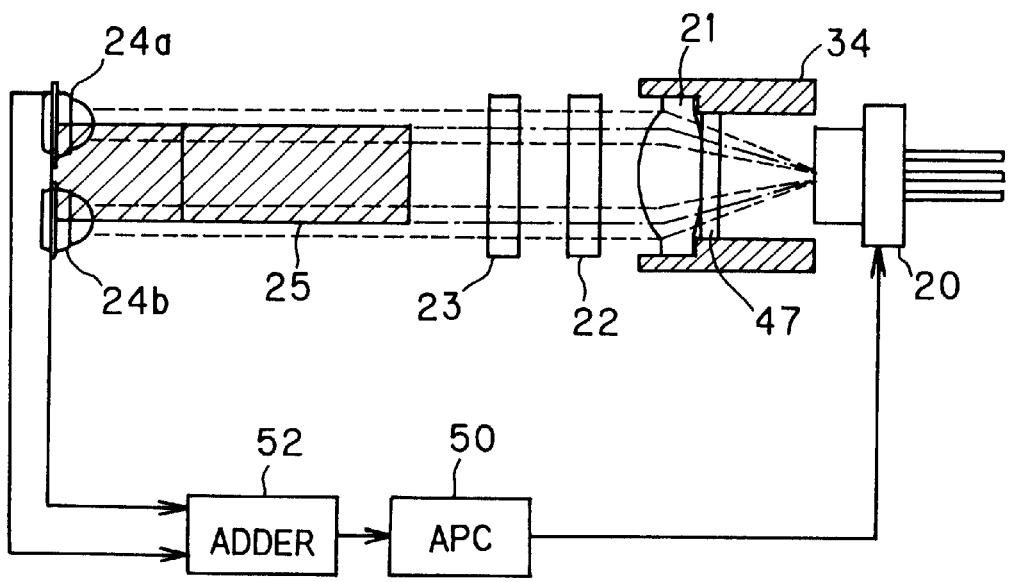

Next, the fifth embodiment of the present invention will be described with reference to FIGS. 10A, 10B, 11A and 11B. FIG. 10A is a side view of the optical pickup device according to the fifth embodiment, and FIG. 10B is a plan view thereof. In the fifth embodiment as illustrated, in addition to the configuration of the first embodiment, two front monitor detectors are provided on both sides of the elliptic beam to stabilize the light reception by the front monitor detectors. Since other elements are the same as those in the first embodiment, the optical elements downstream of the beam splitter 25 and the reflection film 26 are omitted from the illustration in FIGS. 10A and 10B. As shown in FIG. 10B, in the optical pickup device of the fifth embodiment, the light beam emitted from the semiconductor laser 20 passes through the aperture limiting member 47, the collimator lens 21, the 1/2 wavelength plate 22 and the grating 23. Then, the light beam travels along the three optical paths, one enters the beam splitter 25 and the remaining two does not enter the beam splitter and directly reach the front monitor detectors 24a and 24b.

Figure 11B:
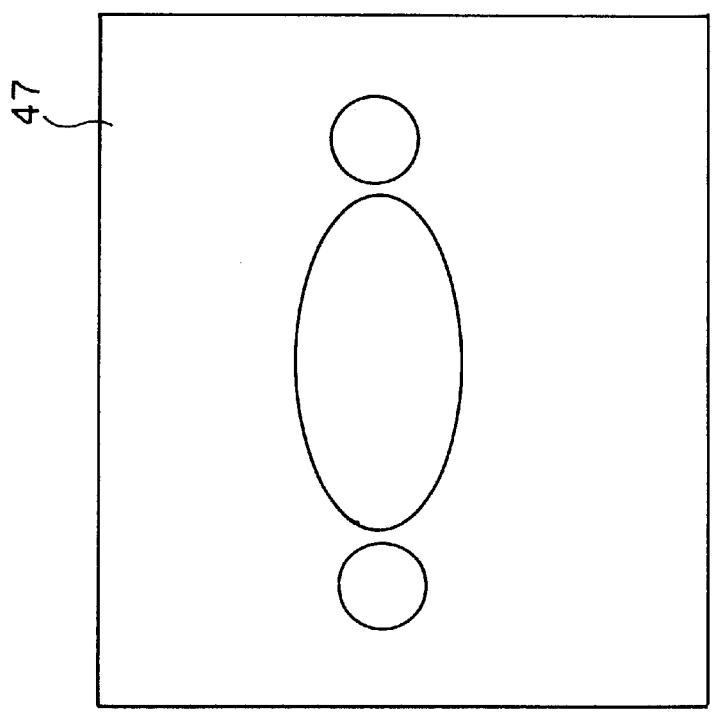
FIG. 11B shows an example of the aperture limiting member according to the fourth embodiment of the present invention.
Figure 11A:
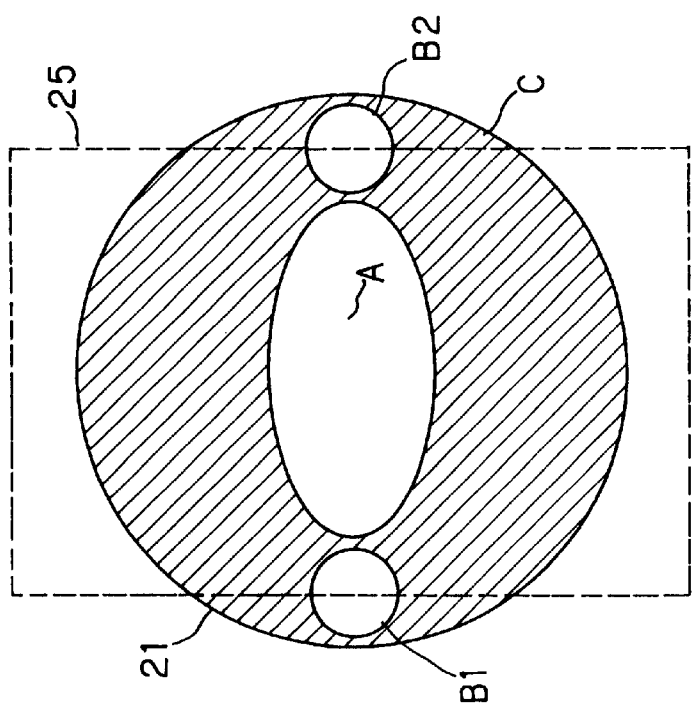
FIG. 11A is a perspective view of the collimator lens and the beam splitter, viewed from the side of the semiconductor laser, according to the fourth embodiment of the present invention.

The aperture limiting member 47 has the shape as shown in FIG. 11B. Therefore, as shown in FIG. 11A, the light beam enters the collimator lens 21 of the fifth embodiment in the first area A of the elliptic shape at the center, the second area B1, and the second area B2. No light beam impinges upon the third area represented by the hatching, because the aperture limiting member 47 interrupts the light beam in the third area C.

As described above, the optical pickup device of the fifth embodiment is provided with two front monitor detectors 24a and 24b. The output signals of those two detector are added to each other by the adder 52, and the resultant signal is supplied to the APC circuit 50. Thus, the quantity of light received by the front monitor detectors can be increased in comparison with the case of the first embodiment, and the accuracy in controlling the power intensity of the light beam from the semiconductor laser may be improved. In addition, since the detectors 24a and 24b are positioned to receive both side components of the light beam, if the position of the optical elements such as the semiconductor laser 20 slightly shifts in the left-right direction in FIG. 11A due to aging and accordingly the light quantity received by one of the detectors 24a or 24b decreases, the light quantity received by the other detector increases. Therefore, the total received light quantity of the detectors 24a and 24b is maintained constant. It is noted that the front monitor detectors 24a and 24b may be positioned to receive the separated light beams aligned in the direction of the short axis of the elliptic light beam.

6th Embodiment

Figure 12A:
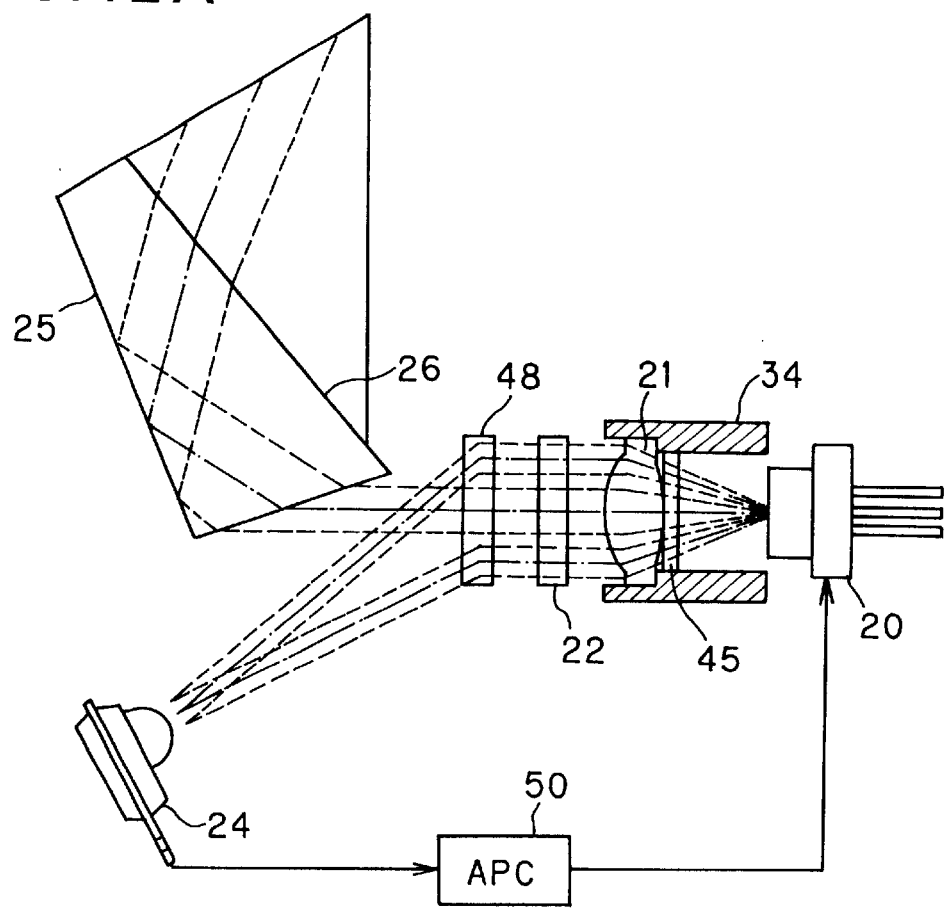
FIG. 12A is a diagram showing a schematic configuration of an optical pickup device according to a sixth embodiment of the present invention.
Figure 12B:
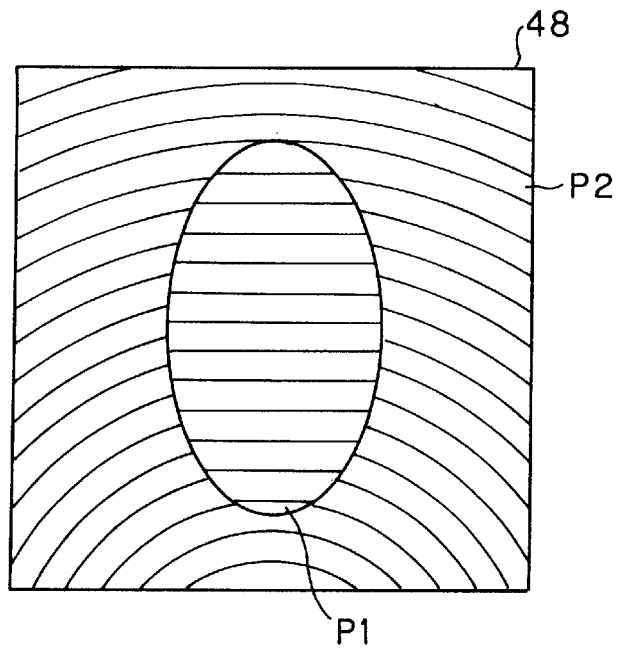
FIG. 12B is a planview showing a grating used in the optical pickup shown in FIG. 12A.

Next, the sixth embodiment of the present invention will be described with reference to FIGS. 12A and 12B. FIG. 12A shows the configuration of the optical pickup device of the sixth embodiment, wherein an additional grating 48 is provided to increase the light quantity received by the front monitor detector 24. Since the configuration of the remaining portion is the same as that in the first embodiment, the optical elements downstream of the beam splitter 25 and the reflection film 26 are omitted from the illustration. FIG. 12B shows the configuration of the additional grating 48. As seen in FIG. 12B, the center portion of the grating 48 is formed with the parallel pattern P1 identical to that in the grating 23 of the other embodiment. The additional grating 48 is provided with the partial concentric circular pattern P2 at the outer circumferential area of the pattern P1. By the diffraction function of the pattern P2, an outer portion of the light beam is separated and directed to the front monitor detector 24. Thus, since all of the light beam incident on the pattern P2 is directed to the front monitor detector 24 as ±1st order diffracted lights, a larger quantity of light beam can be received by the front monitor detector 24. In addition, if the pattern P2 is formed as a saw-shaped blazed hologram, the ratio of the light quantities of the ±1st order diffracted lights can be varied. Thus, the light quantity of one of the 1st order diffracted light guided to the front monitor detector 24 can be 100% in theory and close to 100% in practice, hereby increasing the received light quantity. Further, the light beam incident on the pattern P2 may be converged at a predetermined small area by varying the pitch of the pattern P2, and hence the light detecting portion of the front monitor detector 24 may be downsized. It is noted that the aperture limiting member 45 may be omitted in this embodiment.

Figure 13:
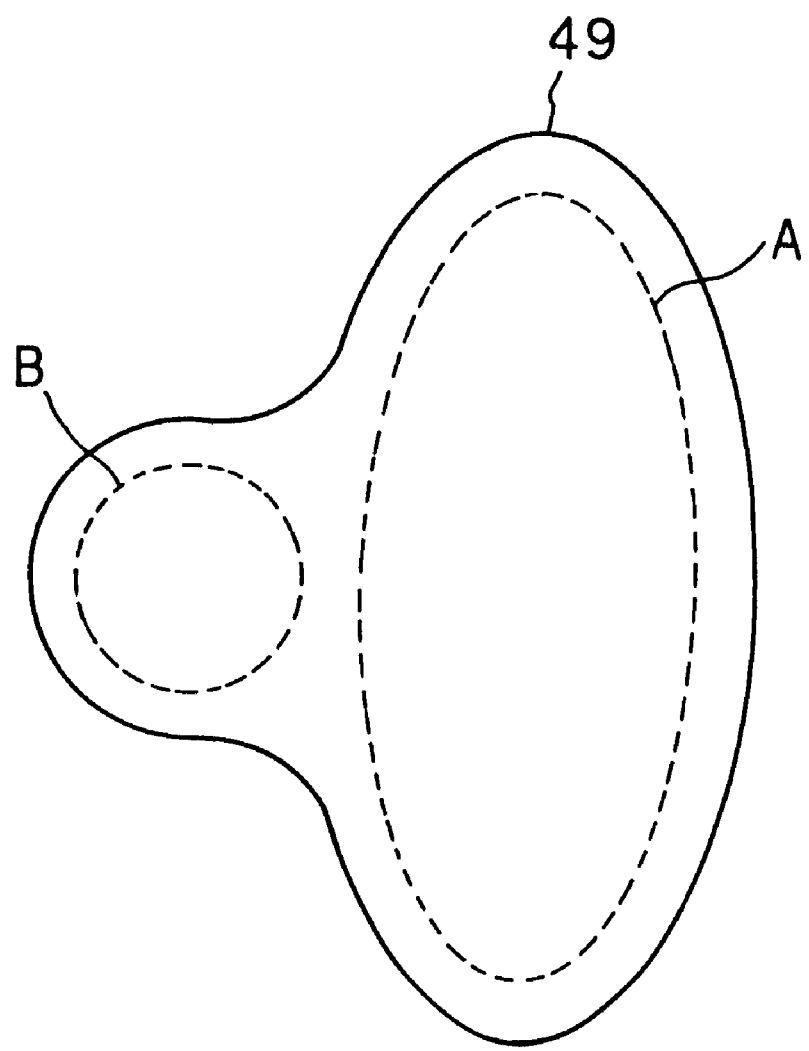
FIG. 13 is a plan view of an example of collimator lens which can be used in the respective embodiments.
Figure 14:
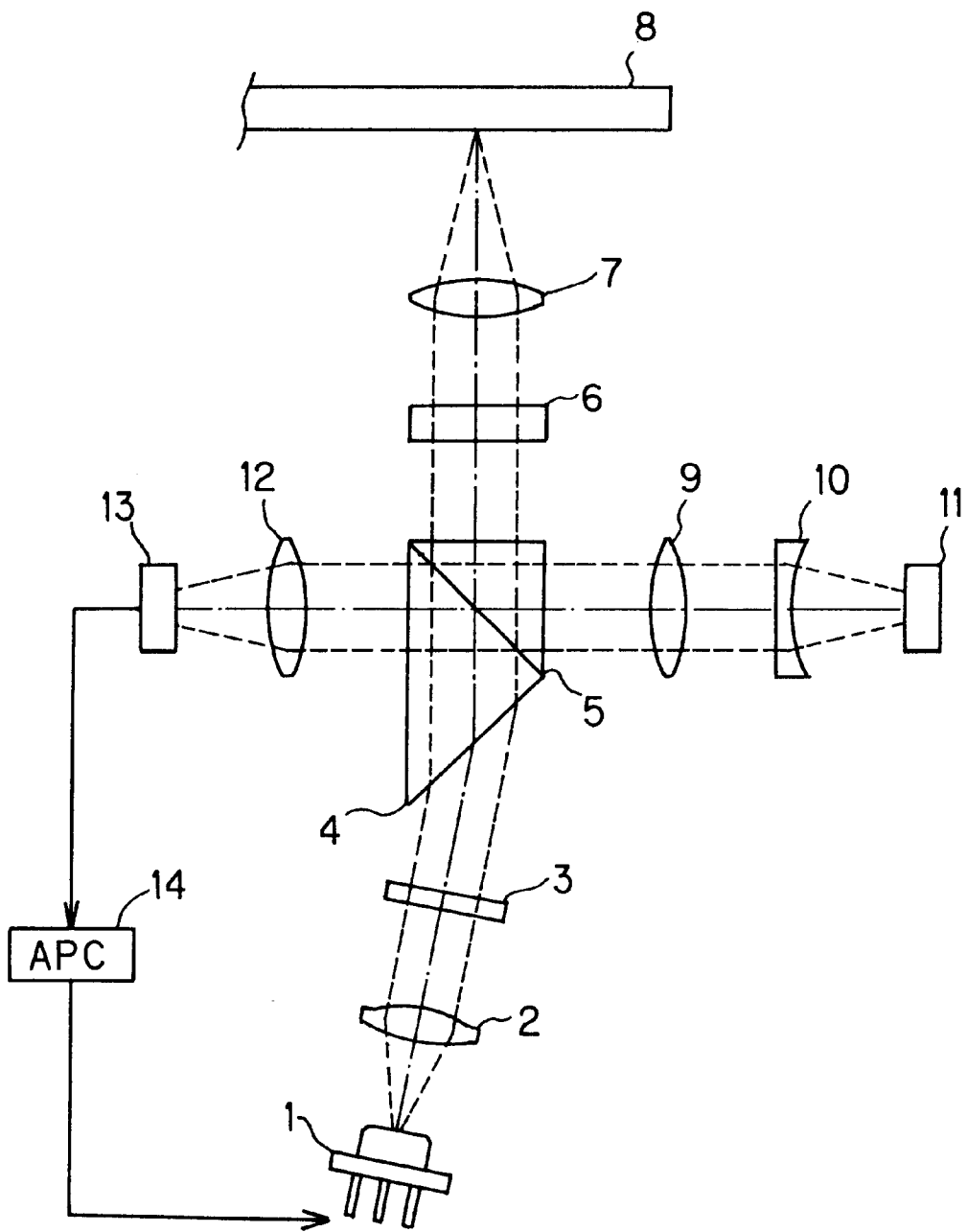
FIG. 14 is a diagram showing a schematic configuration of a conventional optical pickup device.

In the above described embodiments, the stray lights are interrupted by the aperture limiting member of various shapes. However, by forming the collimator lens to have the desired shape to produce only the desired light beam, the aperture limiting member can be omitted. For example, in the first embodiment, by forming the shape of the collimator lens as shown in FIG. 13, no stray light is generated and hence the aperture limiting member can be omitted. The collimator lens 49 shown in FIG. 13 is provided with the first area A and the second area B which correspond to the first area A and the second area B in the first embodiment shown in FIG. 3A. Similarly, also in the other embodiment, by forming the shape of the collimator lens to only pass the desired portion of the light beam, the generation of the stray light may be avoided and the aperture limiting member may be omitted.

As described above, according to the optical pickup device according to the present invention, the efficiency in use of the light beam maybe enhanced. In addition, it is possible to provide an optical pickup device which is hardly affected by the irregularity of the property of the reflection film used in the beam splitter or variation of humidity.

The invention may be embodied on other specific forms without departing from the spirit or essential characteristics thereof. The present embodiments therefore are to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-95414 filed on Mar. 24, 1998 including the specification, claims, drawings and summary is incorporated herein by reference in its entirety.

What is claimed is:

1. A pickup device comprising:

a light source for emitting a light beam;

an optical system for separating the light beam into a main-portion and at least one sub-portion and for guiding the main-portion of the light beam to an information storage medium, the main-portion being a center portion of the light beam and the sub-portion being a portion of the light beam other than the main portion, the optical system comprising an interrupting member for partially interrupting the light beam from the light source and passing only the main-portion and the sub-portion of the light beam, the interrupting member comprising at least an aperture through which the sub-portion of the light beam passes;

a casing for covering a light emitting part of the light source to receive a whole portion of the light beam emitted by the light source, the interrupting member being disposed on the casing at a position receiving the light beam from the light source;

a monitor detector for receiving the sub-portion of the light beam and for outputting a detection signal; and a controller for controlling an output power of the light beam emitted by the light source based on the detection signal.

2. A pickup device comprising:

a light source for emitting a light beam;

an optical system for separating the light beam into a main-portion and at least one sub-portion and for guiding the main-portion of the light beam to an information storage medium, the optical system comprising an interrupting member for partially interrupting the light beam from the light source and passing only the main-portion and the sub-portion of the light beam, the interrupting member comprising a first aperture for passing the main-portion of the light beam and at least one second aperture for passing the sub-portion of the light beam;

a monitor detector for receiving the sub-portion of the light beam and for outputting a detection signal; and a controller for controlling an output power of the light beam emitted by the light source based on the detection signal.

3. A pickup device comprising:

a light source for emitting a light beam;

an optical system for separating the light beam into a main-portion and two sub-portions and for guiding the main-portion of the light beam to an information storage medium, the main-portion being a center portion of the light beam and the sub-portions being portions of the light beam other than the main portion, the optical system comprising an interrupting member for partially interrupting the light beam from the light source and passing only the main-portion and the sub-portions of the light beam;

two monitor detectors each of which receives a respective one of the sub-portions of the light beam to output a detection signal;

a beam splitter comprising a first surface for transmitting the main-portion and two second surfaces for reflecting and guiding the sub-portions to the monitor detectors, respectively;

an adder for adding the detection signals from the monitor detectors to output an added detection signal; and a controller for controlling an output power of the light beam emitted by the light source based on the added detection signal.

4. A pickup device comprising:

a light source for emitting a light beam;

an optical system for separating the light beam into a main-portion and a sub-portion and for guiding the main-portion of the light beam to an information storage medium, the optical system comprising a collimator lens;

a monitor detector for receiving the sub-portion of the light beam and for outputting a detection signal, wherein the collimator lens comprises a miniature convex lens formed at an edge part thereof for directing the sub-portion of the light beam to the monitor detector; and a controller for controlling an output power of the light beam emitted by the light source based on the detection signal.

5. A pickup device comprising:

a light source for emitting a light beam;

an optical system for separating the light beam into a main-portion and sub-portions, and for guiding the main-portion of the light beam to an information storage medium, the optical system comprises a collimator lens, the collimator lens comprising two miniature convex lenses formed at edge parts thereof opposing to each other;

a monitor detector for receiving the sub-portions of the light beam and for outputting a detection signal, wherein the two convex lenses of the collimator lens direct the sub-portions of the light beams to the monitor detector; and a controller for controlling an output power of the light beam emitted by the light source based on the detection signal.

6. A pickup device comprising:

a light source for emitting a light beam;

an optical system for separating the light beam into a main-portion and two sub-portions and for guiding the main-portion of the light beam to an information storage medium, the main-portion being a center portion of the light beam and the sub-portions being portions of the light beam other than the main portion, the optical system comprising an interrupting member for partially interrupting the light beam from the light source and passing only the main-portion and the sub-portions of the light beam, the main-portion and the two sub-portions being aligned in parallel with each other on a single plane, the two sub-portions sandwiching the main-portion on the plane;

two monitor detectors arranged on the plane, each of the monitor detectors receiving respective ones of the two sub-portions of the light beam to output a detection signal;

an adder for adding the detection signals from the monitor detectors to output an added detection signal; and a controller for controlling an output power of the light beam emitted by the light source based on the added detection signal.

7. A pickup device comprising:

a light source for emitting a light beam;

an optical system for separating the light beam into a main-portion and a sub-portion and for guiding the main-portion of the light beam to an information storage medium, the main-portion being a center portion of the light beam and the sub-portion being a portion of the light beam other than the main portion, the optical system comprising a diffraction grating having a first grating pattern for directing the main-portion of the light beam to the storage medium and a second grating pattern for directing the sub-portion of the light beam to the monitor detector;

a monitor detector for receiving the sub-portion of the light beam and for outputting a detection signal; and a controller for controlling an output power of the light beam emitted by the light source based on the detection signal.

8. A pickup device according to claim 7, wherein the second grating pattern directs all components of the light beam other than the main-portion to the monitor detector as the sub-portion of the light beam.

9. A pickup device comprising:

a light source for emitting a light beam;

a collimator lens for separating the light beam into a main-portion and a sub-portion;

a monitor detector for receiving the sub-portion of the light beam and for outputting a detection signal; and a controller for controlling an output power of the light beam emitted by the light source based on the detection signal, the collimator lens guiding the main-portion of the light beam to an information storage medium.

10. A pickup device comprising:

a light source for emitting a light beam;

an optical element which is formed independently of and separately from any other optical elements and is the only optical element within the pickup device that is used for separating the light beam into a main-portion and a sub-portion, the optical element guiding the main-portion of the light beam to an information storage medium, the main-portion being a center portion of the light beam and the sub-portion being a portion of the light beam other than the main-portion;

a monitor detector for receiving the sub-portion of the light beam and for outputting a detection signal; and a controller for controlling an output power of the light beam emitted by the light source based on the detection signal.

11. A pickup device according to claim 10, wherein the optical element is arranged outside of a light emitting unit.

* * * * *